(12) United States Patent
Worthington

(10) Patent No.: US 11,135,658 B1
(45) Date of Patent: Oct. 5, 2021

(54) TOOL HOLDER WITH INDUCTION DISRUPTION CAVITY

(71) Applicant: Techniks, LLC, Indianapolis, IN (US)

(72) Inventor: Scott Worthington, Flat Rock, IN (US)

(73) Assignee: Techniks, LLC, Indianapolis, IN (US)

( * ) Notice: Subject to any disclaimer, the term of this patent is extended or adjusted under 35 U.S.C. 154(b) by 0 days.

(21) Appl. No.: 17/308,277

(22) Filed: May 5, 2021

(51) Int. Cl.
*B23B 31/117* (2006.01)
*B23Q 3/18* (2006.01)

(52) U.S. Cl.
CPC .......... *B23B 31/1179* (2013.01); *B23Q 3/183* (2013.01); *B23B 2240/28* (2013.01)

(58) Field of Classification Search
CPC . B23B 31/1179; B23B 2240/28; B23Q 3/183; B23P 11/027; Y10T 279/17957; Y10T 409/30952
See application file for complete search history.

(56) References Cited

U.S. PATENT DOCUMENTS

| 6,339,868 B1* | 1/2002 | Nagaya | B23P 11/027 29/447 |
| 6,390,482 B1* | 5/2002 | Hanoch | B23B 31/02 279/102 |
| 2005/0029423 A1* | 2/2005 | Vlismas | B23Q 11/1023 248/314 |

FOREIGN PATENT DOCUMENTS

CA 2435303 A1 * 7/2002 ............... H05B 6/38
WO WO-2010023412 A1 * 3/2010 ......... B23B 31/1179

\* cited by examiner

*Primary Examiner* — Eric A. Gates
*Assistant Examiner* — Paul M Janeski
(74) *Attorney, Agent, or Firm* — Shuttleworth & Ingersoll, PLC; Jason R. Sytsma

(57) ABSTRACT

A first section for connecting a tool holder to the machining center and a tool holding section for receiving and holding a shank of a tool therein. A cavity is provided at the bottom of the retaining bore opposite from the front face of the tool holding section with a diameter larger than a diameter of the retaining bore near the front face of the tool holding section for disrupting induction of heating of the first section reducing the time to heat the tool holding section.

11 Claims, 4 Drawing Sheets

TOOL HOLDER WITH INDUCTION DISRUPTION CAVITY

TECHNICAL FIELD

This disclosure relates to a tool holder, and more specifically, this disclosure relates to a shrink-fit tool holder with a reduced inner diameter to decrease the thermal conductivity of the tool holder.

BACKGROUND INFORMATION

A machining center is a computer numerical control (CNC) machining tool with an automatic tool-changing function. The machining center can automatically perform various working such as milling, drilling or notching, boring, tapping, etc. on works set thereto with improved efficiency. A tool holder comprises generally of a tapered portion adapted to be connected to a spindle of a machining center, a manipulator-engaging portion, and a tool holding section for firmly holding the tool.

One type of tool holder is a shrink-fit tool holder, which can firmly hold a tool with excellent dynamic balancing suitable for high-speed work. The shrink-fit tool holder comprises of a tapered connecting portion, a manipulator-engaging portion, and a tool holding section for firmly holding a tool. A shank of the tool is inserted into an aperture of the tool holding section and secured by shrinkage fitting.

The conventional shrink-fit tool holders utilize differences in thermal expansion coefficients between the tool-holding sections and the tool shanks. The tool shanks are made of materials having low thermal expansion coefficients such as sintered carbides, high speed steel, etc., while the tool-holding sections are made of high-expansion materials such as hot work tool steel, nickel-chromium steel, etc.

Tool holders must be heated to insert and extract the tool. The amount of time to heat and cool the tool holder is partially dependent upon the mass of the tool holder, which is based on the thickness of the bore wall and the thickness of the bore relief wall at the end of the bore. But the thickness of the bore wall and the bore relief provide necessary strength and rigidity for the tool holder.

Accordingly, there is a need for an improved tool holder with a reduced bore relief wall that maintains its strength and rigidity.

SUMMARY

Disclosed is a tool holder adapted to be connected to a machining center according to this disclosure. The tool holder comprises of a first section for connecting the tool holder to the machining center. A tool holding section for receiving and holding a shank of a tool therein, wherein the tool holding section comprises of an outer diameter surface, a front face, and a retaining bore extending from the front face into the tool holding section for receiving and holding the shank of the tool therein. A cavity is provided at the retaining bore opposite from the front face of the tool holding section comprising a diameter larger than a diameter of the retaining bore near the front face of the tool holding section for disrupting induction of heating of the first section reducing the time to heat the tool holding section.

In an embodiment, the cavity comprises of a tapered surface extending into the cavity from the retaining bore. The tapered surface can extend to a bottom of the cavity that is opposite from the front face. In other embodiments, the tool holding section can comprise of a shoulder at the end of the retaining bore for increasing the diameter of the cavity and the tapered surface extends from the shoulder to a bottom of the cavity, which is opposite the front face. In such embodiments, the tool holding section comprises of a tapered surface with an angle ($\alpha$) and the cavity comprises of a tapered surface of an angle ($\beta$). It can be beneficial to provide an angle ($\alpha$) of the tapered surface of the tool holding section that is substantially equal to angle ($\beta$) the tapered surface of the cavity. This allows for a wall thickness of the cavity measured to the outer diameter surface in a range of less than thirty five percent (35%) to greater than twenty percent (20%) of the diameter of the retaining bore. The diameter of the cavity can be at least ten percent (10%) larger than the diameter of the retaining bore.

BRIEF DESCRIPTION OF THE DRAWINGS

These and other features and advantages of the present invention will be better understood by reading the following detailed description, taken together with the drawings wherein:

FIG. 1 A is a close-up view of the retaining bore of the tool holder.

DETAILED DESCRIPTION OF THE PREFERRED EMBODIMENTS

Figure 1:
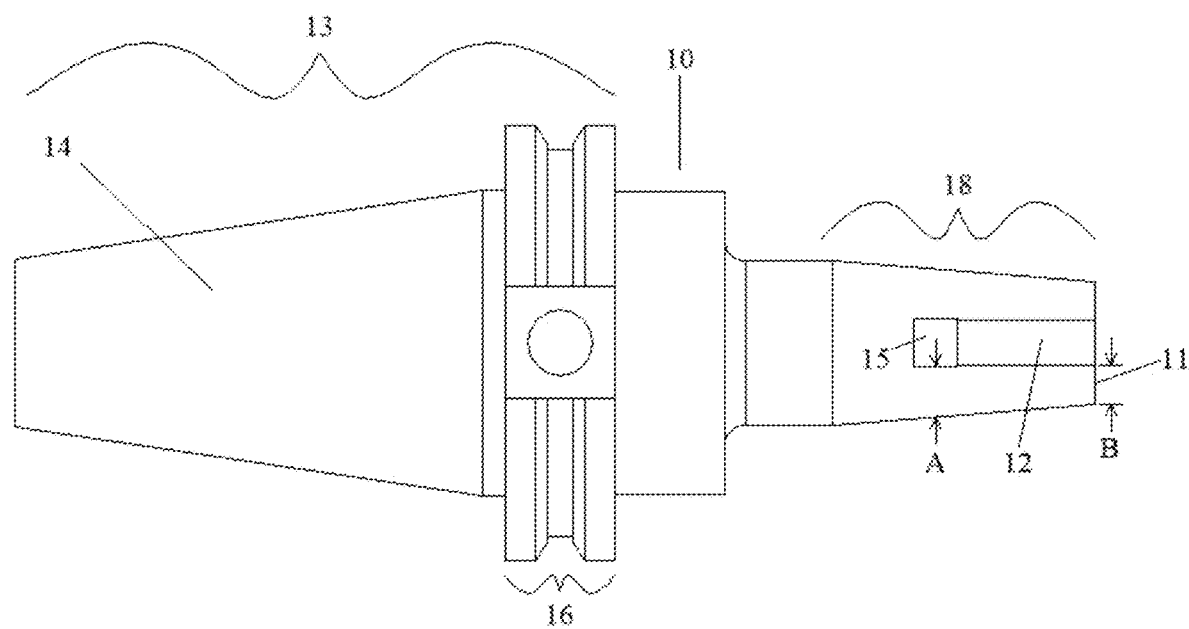
FIG. 1 is a partial cross-sectional side view of a tool holder with a shrink-fit bore according to the prior art.
Figure 1A:
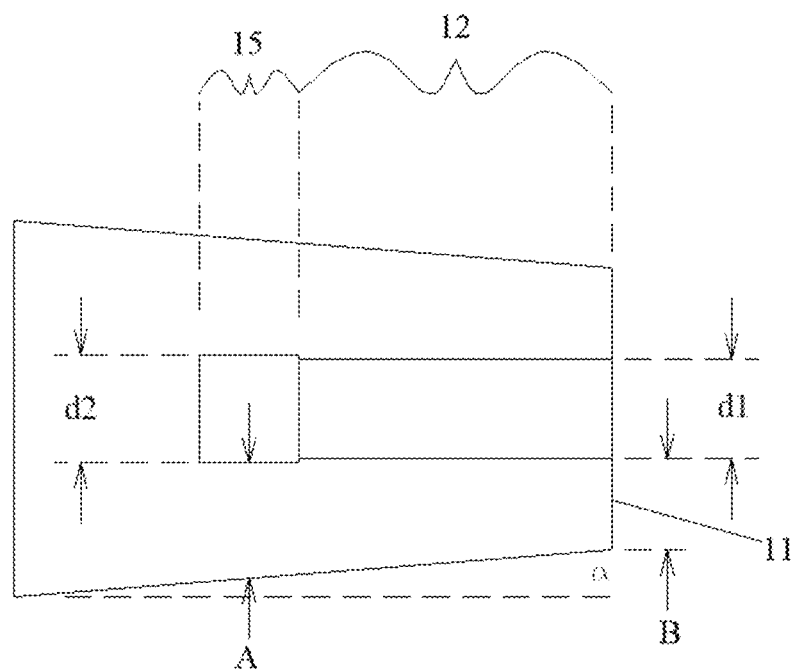

Referring to FIG. 1, disclosed is a tool holder 10 with a retaining bore 12 that can be shrink-fit onto a tool according to the prior art. Tool holder 10 comprises of a first section 13 adapted to be connected to a machining center (CNC). First section 13 can include a tapered connecting portion 14 configured to be received by a CNC machine (not shown) and a manipulator-engaging portion 16 is designed to be engaged by a clamping system in the CNC machine to hold firmly tool holder 10 to the CNC machine spindle. A tool holding section 18 can firmly hold a tool to the tool holder 10.

Tool holding section 18 comprises of a retaining bore 12, which is a hole that is reamed, drilled, ground, or milled to a specific depth related to the bore diameter of tool holding section 18. Retaining bore 12 has a minimum diameter (d1), which is the diameter of the opening of retaining bore 12 at the distal end of tool holding section 18. This minimum diameter (d1) opening is slightly smaller than the diameter of the cutting tool at its shank. The shank of the tool is inserted and gripped by retaining bore 12 of tool holding section 18 by shrink fitting, in which the cutting tool is inserted into the retaining bore 12 with the tool holding section 18 thermally expanded (and its retaining bore 12 radially expanded) by heating, and then the tool holding section 18 is allowed to cool down. This process rigidly fixes the shank of the tool to the retaining bore 12 of the tool holding section 18.

The bottom of retaining bore 12 can have a bore relief 15 which is a shouldered hole at the bottom of retaining bore 12 with a diameter (d2) that is slightly larger than minimum diameter (d1) of retaining bore 12. Bore relief 15 is added to allow space for the bore grinding process during production of the tool holder.

Diameter (d2) of bore relief 15 is slightly larger than minimum diameter (d1) of retaining bore 12. But this difference in diameter is generally less than 5% of bore diameter (d1), since more space for grinding the bore is not needed. Because the outer diameter of tool holding section 18 is tapered, wall thickness (B) near the front of retaining bore 12 is much thinner than wall thickness (A) at bore relief 15 resulting in excess material that must be heated up and cooled down for insertion and extraction of the tool.

This disclosure is directed to reducing the thickness of the wall at bore relief 15 in order to decrease the thermal conductivity of tool holding section 18. By decreasing the thickness of the wall, less heat can be conducted away from tool holding section 18 to first section 13. The less material in the wall at the bottom of retaining bore 12 and/or bore relief 15 also means tool holding section 18 heats up and cools down faster.

Bore 12 has a linear cylindrical surface area beginning from a front face 11 of tool holding section 18 of a diameter (d1). The outer diameter of tool holding section 18 is tapered from front face 11 toward manipulator-engaging portion 16. This means that the thickness of retaining bore 12 near front face 11 as measured by dimension "B" is less than the thickness measured by dimension "A".

The result is that the wall is thicker at the bottom of retaining bore 12 and/or at bore relief 15 than it is near front face 11 of tool holding section 18. This increased thickness of material means that the bottom of retaining bore 12 takes longer to heat up and cool down than the front of retaining bore 12. It also means that during induction heating, both the wall of retaining bore 12 and bore relief 15 are being heated.

Figure 2:
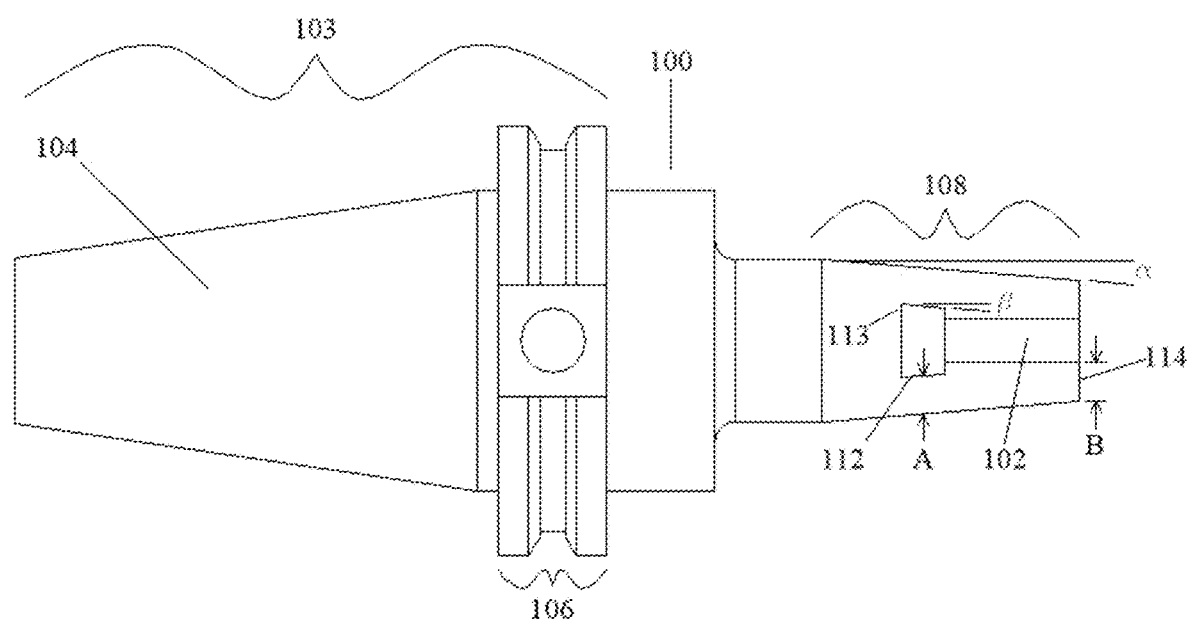
FIG. 2 is a partial cross-sectional side view of a tool holder with a shrink-fit bore according to this disclosure.
Figure 2A:
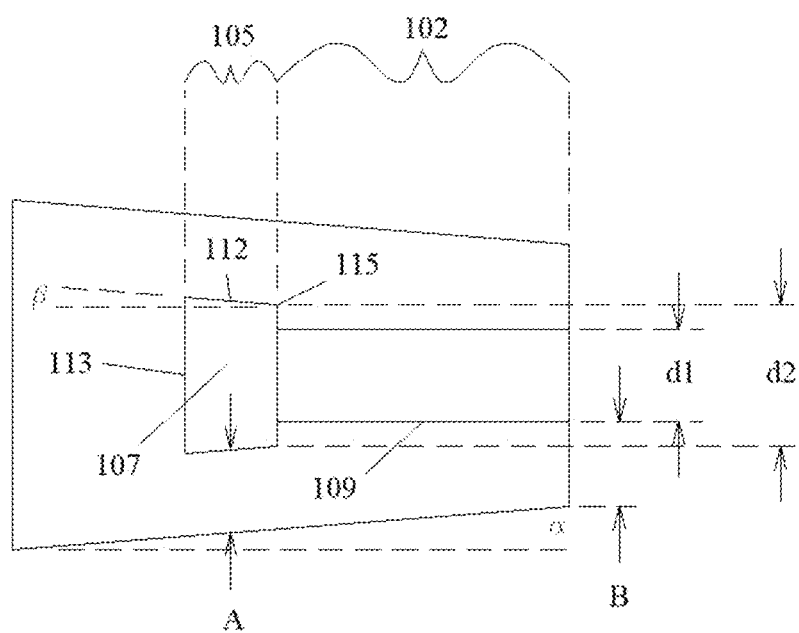
FIG. 2A FIG. is a close-up view of a cavity of the tool holder of FIG. 2.

FIG. 2 shows a tool holder 100 according to this disclosure. Tool holder 100 comprises of a retaining bore 102 that can be shrink-fit onto a tool. Tool holder 100 comprises of a first section 103 adapted to be connected to a machining center (CNC). This first section 103 can include a tapered connecting portion 104 configured to be received by a CNC machine (not shown) and a manipulator-engaging portion 106 is designed to be engaged by a clamping system in the CNC machine to hold firmly tool holder 100 to the CNC machine spindle. A tool holding section 108 can firmly hold a tool 110 (shown in FIG. 2) to the tool holder 100. A shank of the tool is inserted into retaining bore 102 of tool holding section 108 and secured by a shrink fitting.

The diameter (d1) of retaining bore 102 near a front face 114 of tool holding section 108 is substantially consistent throughout most its length. Instead of a bore relief at the end of retaining bore 102, a cavity 107 comprising an area of increased diameter with respect to diameter (d1) of retaining bore 102 is provided. Cavity 107 disrupts induction of heating of first section 103 to reduce the time to heat tool holding section 108.

Cavity 107 can comprise a shoulder 115 at the end of retaining bore 102 to create a diameter (d2) next to the bottom of retaining bore 102 that is at least ten percent (10%) larger than diameter (d1) of retaining bore 102. A surface 112 can extend from shoulder 115 to a bottom of cavity 107, which is opposite of the opening of retaining bore 102 at front face 114 of tool holding section 108. Surface 112 can comprise a taper that extends from shoulder 115 to a bottom 113 of cavity 107. Instead of shoulder 115, surface 112 can comprise a taper that extends directly from the end of retaining bore 102 to the bottom 113 of cavity 107.

Preferably, cavity 107 comprises of an area of increasing diameter meaning that cavity 107 increases in diameter throughout its depth. This results in a thickness "A" between surface 112 of cavity 107 and the outer diameter of tool holding section 108 being between 20% and 35% the bore diameter (d1) of tool holding section 108 (including any value between that range), notwithstanding the fact that the outer diameter of tool holding section 108 is tapered from front face 114 toward manipulator-engaging portion 106.

Surface 112 in cavity 107 can have a taper at an angle β that makes dimension A less than 35% and greater than 20% of diameter d1. Angle β should match taper a of outer surface of tool holding section 108, but can be +/−10 degrees of taper a or any angle there between. The taper a of the outer diameter of tool holding section can be any tool holding nose taper.

With thickness A of cavity 107 being at least greater than 20% but no more than 35% of the bore diameter (d1), tool holder 100 has less material near the back end of tool holding section 108. This means that the area represented by dimension A conducts less heat, and therefore, allows retaining bore 102 to heat more quickly. There is also less material to heat up and cool down. Cavity 107 partially inhibits the induction heating of the first section 103 reducing the time to heat tool holding section 108. The reduced material in the area of cavity 107 reduces the resistance of expansion of retaining bore 102 due to the temperature gradient from front face 114 of tool holding section 108 to first section 103.

The thickness A of the wall of cavity 107 can be adjusted to suit the rigidity and heating needs. When thickness A of cavity 107 is between 20% and 35% the bore diameter (d1) (or any value within that range), rigidity is good and heating is improved. Reducing thickness A of cavity 107 reduces heating time, but also reduces rigidity. Increasing thickness A of cavity 107 improves rigidity, but also increases heating time.

The dimensions described above can create a tool holding section 108 of tool holder 100 with improved operating characteristics. The reduction in wall thickness "A" of cavity 107 provides approximately 16-32% less material to draw heat away from retaining bore 102. This also corresponds to approximately 6-10% less material to heat and cool, which means tools can be inserted and removed from tool holder 100 faster. There is also less of a temperature gradient throughout retaining bore 102 which means retaining bore 102 will expand more consistently and also have less resistance to expansion due to the colder first section 103. The cavity 107 disrupts the field from the induction heating to reduce parasitic heating of the first section 103.

While the principles of the invention have been described herein, it is to be understood by those skilled in the art that this description is made only by way of example and not as a limitation as to the scope of the invention. Other embodiments are contemplated within the scope of the present invention in addition to the exemplary embodiments shown and described herein. Modifications and substitutions by one of ordinary skill in the art are considered to be within the scope of the present invention, which is not to be limited except by the following claims.

I claim:

1. A tool holder comprising,
   a first section adapted to be connected to a machining center; and
   a tool holding section for receiving and holding a shank of a tool therein, the tool holding section further comprising:
   an outer surface comprising a diameter;
   a front face;

a retaining bore extending from the front face into the tool holding section for receiving and holding the shank of the tool therein; and a cavity at a bottom of the retaining bore opposite from the front face of the tool holding section comprising a diameter that is at least ten percent larger than a diameter of the retaining bore near the front face of the tool holding section for disrupting induction of heating of the first section reducing the time to heat the tool holding section, wherein the cavity comprises a wall thickness measured to the outer surface that is in a range of less than thirty five percent to greater than twenty percent of the diameter of the bore.

2. The tool holder of claim 1, and further comprising a shoulder at the bottom of the retaining bore.

3. The tool holder of claim 1, wherein the outer diameter of the tool holding section comprises of a tapered surface with an angle ($\alpha$) and the cavity comprises of a tapered surface of an angle ($\beta$).

4. The tool holder of claim 3, wherein angle ($\alpha$) of the tapered surface of the tool holding section is substantially equal to angle ($\beta$) the tapered surface of the cavity.

5. A tool holder comprising
a first section adapted to be connected to a machining center; and
a tool holding section for receiving and holding a shank of a tool therein, the tool holding section further comprising:
an outer surface comprising a diameter;
a front face;
a retaining bore extending from the front face into the tool holding section for receiving and holding the shank of the tool therein; and
a cavity at a bottom of the retaining bore opposite from the front face of the tool holding section comprising a diameter that is at least ten percent larger than a diameter of the retaining bore near the front face of the tool holding section for disrupting induction of heating of the first section reducing the time to heat the tool holding section, wherein the cavity comprises a tapered surface that extends from the retaining bore to a bottom of the cavity that is opposite from the front face.

6. A tool holder comprising:
a first section adapted to be connected to a machining center; and
a tool holding section for receiving and holding a shank of a tool therein, the tool holding section further comprising:
an outer surface comprising a diameter;
a front face;
a retaining bore extending from the front face into the tool holding section for receiving and holding the shank of the tool therein;
a cavity at a bottom of the retaining bore opposite from the front face of the tool holding section comprising a diameter that is at least ten percent larger than a diameter of the retaining bore near the front face of the tool holding section for disrupting induction of heating of the first section reducing the time to heat the tool holding section; and
a shoulder at the bottom of the retaining bore, wherein a tapered surface extends from the shoulder to a bottom of the cavity that is opposite the front face.

7. A tool holder adapted to be connected to a machining center, the tool holder comprising:
a first section for connecting the tool holder to the machining center; and
a tool holding section for receiving and holding a shank of a tool therein;
wherein the tool holding section further comprises:
an outer surface comprising a diameter;
a front face;
a retaining bore extending from the front face into the tool holding section for receiving and holding the shank of the tool therein;
a cavity at a bottom of the retaining bore opposite from the front face of the tool holding section comprising a diameter larger than a diameter of the retaining bore near the front face of the tool holding section for disrupting induction of heating of the first section reducing the time to heat the tool holding section;
a shoulder at the end of the retaining bore; and
a tapered surface that extends from the shoulder to a bottom of the cavity, which is opposite the front face extending from the retaining bore.

8. The tool holder of claim 7, wherein the diameter of the cavity is at least ten percent larger than the diameter of the retaining bore.

9. The tool holder of claim 7, wherein the outer diameter of the tool holding section comprises of a tapered surface with an angle ($\alpha$) and the cavity comprises of a tapered surface of an angle ($\beta$).

10. The tool holder of claim 9, wherein angle ($\alpha$) of the tapered surface of the tool holding section is substantially equal to angle ($\beta$) the tapered surface of the cavity.

11. The tool holder of claim 7, wherein the cavity comprises a wall thickness measured to the outer surface in a range of less than thirty five percent to greater than twenty percent of the diameter of the bore.

* * * * *